(12) United States Patent
Richardson et al.

(10) Patent No.: US 6,645,384 B1
(45) Date of Patent: Nov. 11, 2003

(54) METHOD FOR INHIBITING SCALE IN HIGH-CYCLE AQUEOUS SYSTEMS

(75) Inventors: John Richardson, Ashland, VA (US); Michael G. Trulear, Richmond, VA (US); Richard H. Tribble, Richmond, VA (US)

(73) Assignee: Chemtreat, Inc., Glen Allen, VA (US)

( * ) Notice: Subject to any disclaimer, the term of this patent is extended or adjusted under 35 U.S.C. 154(b) by 12 days.

(21) Appl. No.: 09/749,567

(22) Filed: Dec. 28, 2000

(51) Int. Cl.$^7$ .................................................. C02F 5/14
(52) U.S. Cl. ........................ 210/699; 210/701; 252/180
(58) Field of Search ................................. 210/698, 699, 210/700, 701; 252/180, 181

(56) References Cited

U.S. PATENT DOCUMENTS

| | | | | |
|---|---|---|---|---|
| 4,475,356 A | * | 10/1984 | Lewis ........................... | 261/26 |
| 5,078,879 A | * | 1/1992 | Gill et al. .................... | 210/699 |
| 5,547,612 A | * | 8/1996 | Austin et al. ............. | 134/22.19 |
| 5,709,814 A | * | 1/1998 | Gill ............................. | 210/700 |
| 6,068,012 A | * | 5/2000 | Beardwood et al. ........... | 137/3 |
| 6,153,110 A | * | 11/2000 | Richardson et al. ........... | 137/2 |
| 6,315,909 B1 | * | 11/2001 | Hoots et al. ................. | 210/696 |

* cited by examiner

*Primary Examiner*—Peter A. Hruskoci
(74) *Attorney, Agent, or Firm*—Harness, Dickey & Pierce, P.L.C.

(57) ABSTRACT

A composition and an improved method for treating aqueous systems to prevent the accumulation of mineral scale and corrosion which comprises adding to the aqueous system a treatment solution comprising 2 phosphonobutane 1,2,4 tricarboxylic acid and a quad-polymer that includes four discrete monomers (specifically allyloxybenzenesulfonic acid, methallyl sulfonic acid, a copolymerizable non-ionic monomer and an olefinically unsaturated carboxylic acid monomer). The composition and method allow the use of higher cycles of concentration, including aqueous systems having calcite saturation indices (CSI) of more than 200, while inhibiting the formation of calcium carbonate, calcium phosphate, magnesium silicate, and iron scales.

17 Claims, 4 Drawing Sheets

Determination of $CSI_{max}$

LSI v Cycles - PCT Makeup

Calcite Saturation Breakpoint Test
Conductivity And Ca v. Time

Calcite Saturation Breakpoint Test
Total Polymer and Ca v. Time

Determination of $CSI_{max}$

METHOD FOR INHIBITING SCALE IN HIGH-CYCLE AQUEOUS SYSTEMS

BACKGROUND OF THE INVENTION

1. Field of the Invention

This invention is directed to the treatment of aqueous systems, and more specifically to inhibiting scale formation and other solid deposits in industrial heating and cooling systems.

2. Description of the Related Art

The water used in industrial systems such as in steam generating boilers, hot water heaters, heat exchangers, cooling towers, pipelines, gas scrubbing systems and related equipment accumulate various impurities derived from the water. These impurities generally include the alkaline earth cations, such as calcium, barium and magnesium, and some bicarbonates and carbonates, sulphates, phosphates, silicates and the like. The most common impurities in industrial water are the water-hardening metal ions including calcium, magnesium and the carbonate ions. In addition to precipitating as carbonates, calcium and magnesium, as well as the other metals such as iron or copper, react with the sulphates or phosphates to form the respective insoluble complex salts. These reaction products accumulate on the surfaces of the system forming scale and sludge, which substantially reduce the heat transfer efficiency by settling in the systems where they impede flow and insulate heat-transfer surfaces. Moreover, in addition to interfering with the fluid flow and heat transfer, corrosion of the metal surfaces is promoted, since the corrosion inhibitors added to the water are less able to reach the metal surfaces to provide effective protection against the corrosive components within the aqueous system. Further, scale deposits can harbor bacteria, the removal of which is expensive due to the delays inherent in the shutdown-treatment-restart sequence. Maintaining proper residual levels of water treatment chemical actives is critical to the success of high-performance water treatment programs. To provide optimum cost and performance, each active component in the water treatment program must be consistently maintained at residual levels sufficient to achieve treatment efficacy without relying on unnecessarily high levels of treatment chemicals.

Water conservation is another important consideration in the operation of industrial cooling and heating systems and will become more important in some regions as a result of moderate to severe water shortages caused by climate change, contamination and/or population growth. In the face of such shortages, the cost of both water consumption and discharge for industrial users will continue to increase. Additionally, both increased governmental regulation and a desire to reduce costs have motivated industrial users, particularly in industries that have traditionally utilized high levels of water consumption, to identify and apply methods that will enable them to reduce the incremental water consumption.

Improvements in water treatment technology, by allowing increased use of recycled water and permitting increased cycles of operation, have been significant factors in reducing industrial water consumption and discharge, ideally without requiring extensive process redesign or capital investment. However, both the use of recycled water and the use of higher operating cycles generally increase the potential for fouling and place correspondingly greater demands on the water treatment programs.

Early water treatment programs, particularly those for evaporative cooling systems, utilized acid to control the pH and thereby reduce the potential for scaling. More recently, however, the development and increasing use of acid-free organic cooling water treatment programs, also referred to as all-organic programs (AOP), has shifted the focus of high-cycle operation towards eliminating or controlling the deposition of calcium carbonate, calcium phosphate, and magnesium silicate scale. In addition to the scaling concerns, when using higher cycles of concentration in cooling systems, other makeup water components, including iron, ammonia, and the total dissolved solids (TDS), can place severe demands on the treatment program chemicals to control the resulting corrosivity and conductivity of the aqueous system. A treatment program that fails to address these additional concerns can result in galvanic corrosion, interfere with inhibitor film formation, and/or reduce the effectiveness of certain biocides.

The calcium carbonate deposition potential of a cooling water is frequently expressed as a scaling or saturation index. One such index is the Langelier saturation index (LSI) which provides an indication of calcium carbonate ($CaCO_3$) stability in an aqueous system. The LSI is a function of the calcium hardness, alkalinity, conductivity and temperature of the aqueous system. A typical AOP can operate satisfactorily in aqueous systems having an LSI between 1.0 and 3.0, but few, if any, are able to function satisfactorily at LSI values above 3.0.

However, LSI calculations are based on bulk water concentrations of calcium and alkalinity and do not take into account other soluble species that may effect the activity of the calcium or carbonate ions. For this reason, the inventors prefer to use the calcite saturation index (CSI) for evaluating treatment program performance. The CSI defines the relative degree of saturation of calcium carbonate as a ratio of the ion activity product to the solubility product according to the formula:

$$CSI = [Ca^{2+}][CO_3^{2-}]/K_{sp\ CaCO_3}$$

Unlike the LSI method, the CSI calculation takes into account the effects of ion pairing and can be used to compare the scaling tendency of waters of with very different compositions. Commercially available software applications, such as Water Cycle™ from French Creek Software, Kimberton, Pa., permit rapid calculation of CSI and many other water parameters based on makeup water chemistry.

Most AOPs can achieve satisfactory results in aqueous systems having an operating CSI of between 100 to 200. Although there have been reports of an AOP that that can function satisfactorily in an aqueous system having an operating CSI of approximately 300, in practice such supersaturated waters generally present an unacceptable risk of total bulk water precipitation. Bulk water precipitation can be a catastrophic event in an industrial system resulting in, at a minimum, extensive fouling of the system, and, at worst, actual structural failure. Any practical treatment system must, therefore, provide a sufficient operating margin to avoid such an occurrence.

In addition to calcium carbonate scale, industrial systems must generally contend with silicates as well. Silicates may deposit on heat transfer surfaces as a scale of colloidal silica or as magnesium silicate and may, in some instances, become a limiting factor in a given aqueous system. In particular, the scaling potential of magnesium silicate increases for values of the system pH above 8, but does not typically become an significant concern until the system pH exceeds 8.5. Silica can co-precipitate with iron and magnesium hydroxides and the silicate may also precipitate with calcium salts. In systems with an alkaline pH, levels of silicate in general should be kept such that the product of the magnesium and silicon concentrations (in parts per million) is below 20,000 (i.e., Mg*Si<20,000). It is especially important to avoid the formation of silicates because, once formed, silicate deposits are particularly difficult to remove. To address this problem, various polymeric materials have been developed which show an ability to inhibit colloidal silica and magnesium silicate deposits. These materials are, however, relatively expensive and are thus usually restricted to specific applications where silicate is the dominant contaminate and the potential cost savings justify their use.

Increased phosphate levels in the available makeup water is also becoming an issue for many industrial applications that are attempting to maintain high-cycle operation. Phosphate may be present in surface waters as a result of agricultural run-off or industrial pollution. The concentration of phosphate in surface waters may also vary over a wide range due to various seasonal and/or drought conditions. Further, municipal water supplies may contribute to the phosphorus content of industrial water by adding polyphosphates as a corrosion inhibitor to protect distribution lines. The addition of polyphosphates is also used in some municipal water supplies to reduce the appearance of "red water" due to the presence of iron oxides. In both of these situations, the treatment levels in municipal waters are typically around 1 mg/liter of polyphosphates. Corrosion inhibition can also be improved with the addition of a small amount of zinc. Reversion of polyphosphates to phosphate occurs under low pH conditions, high temperature, and/or in the presence of metal oxides, such as iron oxide. The combined effect of all of these various sources of phosphate in the available makeup water can lead to significant calcium phosphate deposition problems, particularly in systems having an alkaline pH and operating at higher cycles of concentration.

Particularly at high operating cycles, it is important to maintain treatment chemical levels above certain minimum operating levels. Given the high degree of saturation that will typically characterize high-cycle aqueous systems, failing to maintain sufficient levels of the active inhibiting components can quickly result in significant scale formation. Although maintaining the treatment chemical concentrations at levels significantly above the specified minimum level may provide an increased safety margin, this technique is generally undesirable for several reasons. For example, maintaining excessively high levels of treatment chemicals represents both an unnecessary, and possibly significant, expense. Further, many of the most common treatment chemicals have solubility limits that will determine the maximum safety margin that can be established and maintained. Additionally, some treatment chemicals become corrosive at the high concentration levels that would be necessary to establish the desired safety margin.

While measurement of product tracers has proven to be a convenient way to estimate product concentration, methods for measuring the actual concentration of individual treatment actives are gaining increased attention. This is particularly important in higher stress conditions where individual components may be lost or consumed at dramatically different rates. Recent publications have shown the applicability of measuring specific polymeric dispersants through a simple field test. One such method is described U.S. Pat. No. 6,153,110 to Richardson et al., ("Richardson") the contents of which is incorporated herein by reference. Richardson discloses a technique for determining both a quantitative measurement of the polymer component and differentiating between Free and Total polymer in the aqueous system to give greater insight into dispersant efficiency and the potential onset of scaling.

The majority of acid free AOP cooling water treatment programs are based on combination of phosphonate scale inhibitors and polymeric dispersants along with yellow metal corrosion inhibitors. At high cycles of operation, the choice of polymeric dispersant is key to the overall performance of the treatment program. The majority of commonly used polymers have certain known strengths, but are also known to suffer from some distinct performance weaknesses, particularly when employed in high-cycle, high-stress cooling water applications. For example, polyacrylates are generally effective calcium carbonate inhibitors and dispersants, but under high hardness conditions they may precipitate as calcium salts. Polyacrylates are also sensitive to the presence of iron and are only weak calcium phosphate inhibitors. Polymaleates are strong crystal modifiers which, when used in high-cycle applications, give excellent scale control, particularly when used in combination with phosphonates, but are weak calcium phosphate inhibitors and relatively poor dispersants. Sulfonated co-polymers and ter-polymers are excellent calcium phosphate inhibitors, can tolerate iron, and are generally good dispersants but are, however, inferior to polyacrylates and polymaleates as calcium carbonate inhibitors.

BRIEF SUMMARY OF THE INVENTION

This invention relates to a novel composition and a method for treating aqueous systems to prevent the accumulation of mineral scale and corrosion which comprises adding a treatment solution comprising a phosphonate (2-phosphonobutane-1,2,4-tricarboxylic acid), and a quad-polymer, Quadrasperse™, that includes four discrete monomers (specifically allyloxybenzenesulfonic acid (about 3.5 mole %), methallyl sulfonic acid (about 2.5 mole %), a copolymerizable non-ionic monomer (about 13–18 mole % methyl methacrylate) and an olefinically unsaturated carboxylic acid monomer (about 76–81 mole % acrylic acid)) and has an average molecular weight of less than about 50,000, to the aqueous system. The quad-polymer composition according to the present invention overcomes many of the limitations of conventional polymers now used in water treatment. In particular, the quad-polymer composition provides stronger calcium carbonate inhibition than known co-polymers or ter-polymers, lacks the calcium sensitivity issues that may exist with polyacrylates, and provides better dispersancy than polymaleates.

It is an object of the invention to provide a water treatment composition that provides excellent calcium phosphate and calcium phosphonate inhibition and dispersancy.

It is a further object of the invention to provide a water treatment composition that exhibits calcium carbonate deposit control at CSI/LSI limits exceeding those possible with traditional AOPs.

It is a further object of the invention to provide a water treatment composition that exhibits superior thermal stability at high temperatures.

It is a further object of the invention to provide a water treatment composition that exhibits good calcium carbonate inhibition and iron dispersancy.

It is a further object of the invention to provide a water treatment composition that exhibits superior magnesium silicate deposit control.

It is a further object of the invention to provide a water treatment composition that is directly measurable by field test methods.

DETAILED DESCRIPTION OF THE INVENTION

The effectiveness of the improved treatment program based on the combination of phosphonate and the quad-polymer-polymer was initially evaluated in pilot cooling tower systems. The pilot cooling tower systems could be operated as small-scale, fully-functional evaporative cooling systems and were used for cycle stress tests on various water treatment formulations. Under typical test conditions, the towers are capable of evaporating approximately 40 gallons of water per day (6.3 liters/hour). Makeup water composition and volume was fully controllable and fed from nearby storage tanks. The pilot cooling tower systems used were fully automated using customized data acquisition and control software. The systems have four stainless steel heat exchangers and are equipped with mild steel corrosion rate probes.

One objective of the pilot cooling tower system evaluation was to determine the maximum calcite saturation index (CSI) which could be achieved by increasing concentration cycles in the cooling system. In these tests, water composition given below in Table 1

TABLE 1

Figure 1:
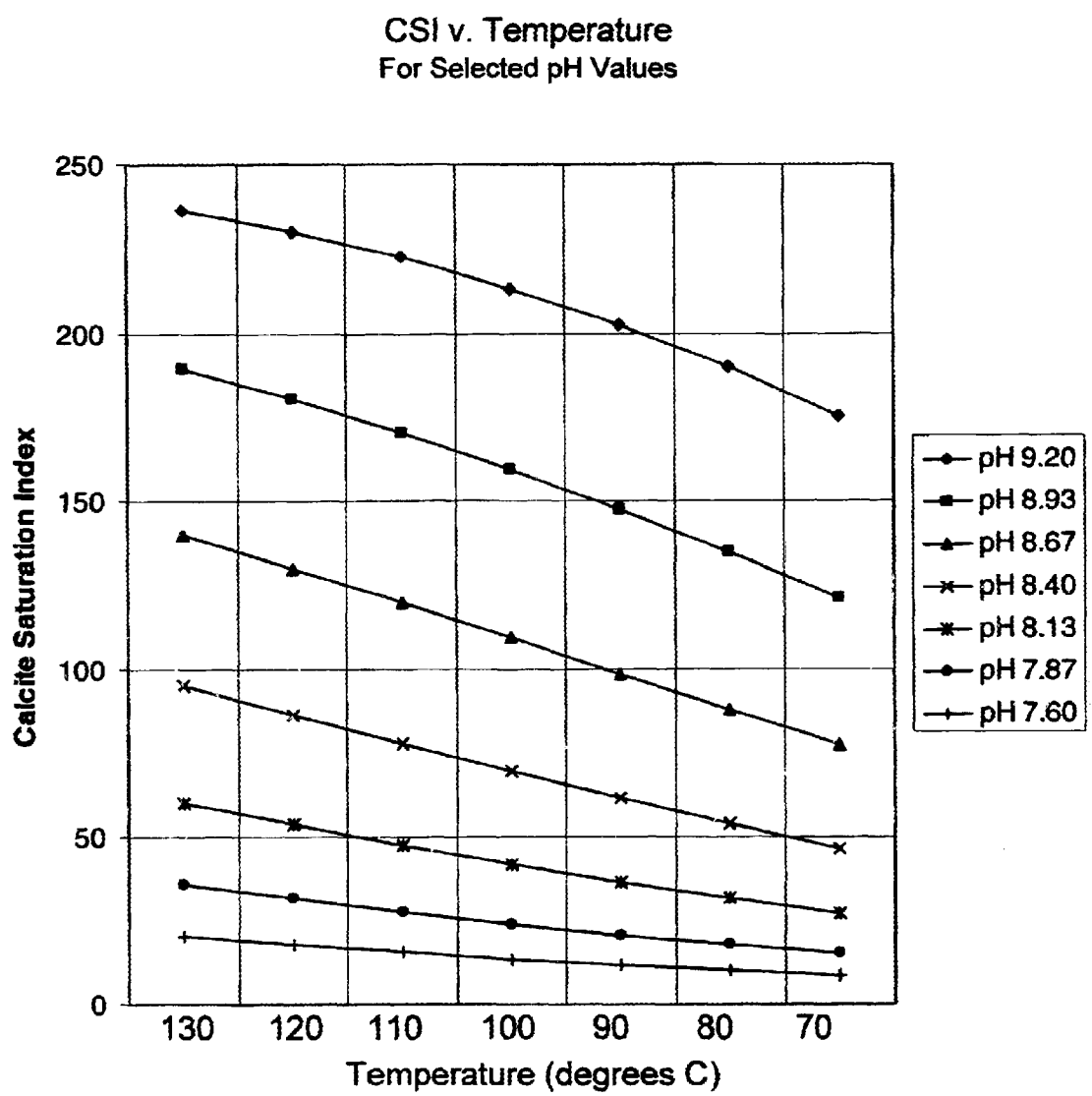
FIG. 1 is a chart of calcite saturation vs. pH and temperature for the makeup water composition reflected in Table 1 at 6 cycles of operation.
Figure 2:
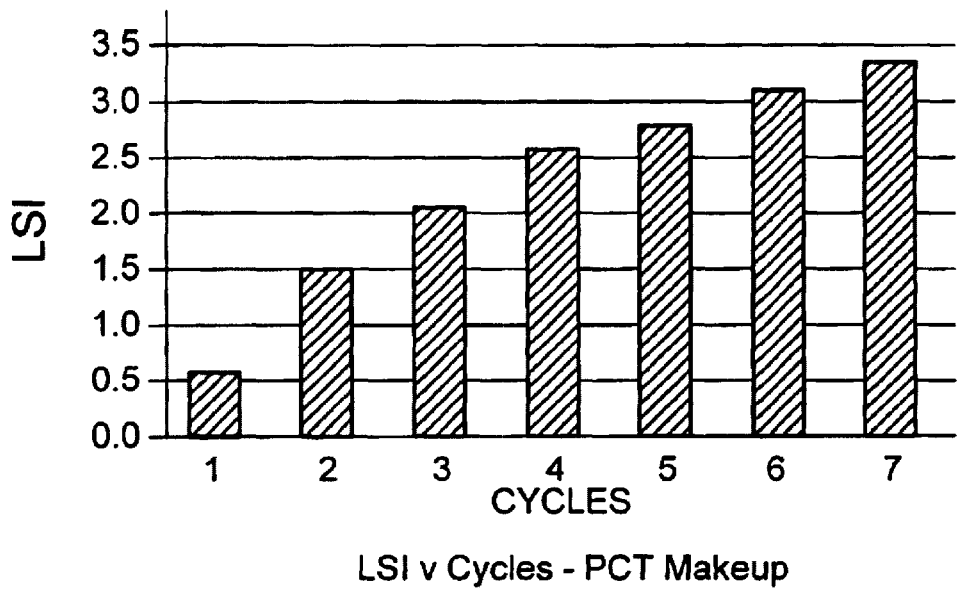
FIG. 2 is a chart of LSI vs. cycles of concentration for the test water for the makeup water composition reflected in Table 1 at 6 cycles of operation.

| Make-up Water Analysis For CSI Break Point Tests | |
|---|---|
| pH | 8.3 |
| Conductivity μmho | 528 |
| 'M' Alkalinity as $CaCO_3$, mg/L | 109 |
| Total Hardness as $CaCO_3$, mg/L | 118 |
| Calcium Hardness as $CaCO_3$, mg/L | 88 |
| Iron, as Fe, mg/L | 0.01 |
| Copper, as Cu mg/L | 0.02 |
| Zinc, as Zn mg/L | 0.03 |
| Sodium, as Na mg/L | 60 |
| Potassium, as K mg/L | 2.7 |
| Total Phosphate, as $PO_4$ mg/L | 0.11 |
| Chloride, as Cl mg/L | 49 |
| Sulfate, as $SO_4$ mg/L | 73 |
| Nitrate, as $NO_3$ mg/L | 0.4 |
| Silica, as $SiO_2$ mg/L | 16 | was cycled up to 4 cycles and then held at that point for at least 24 hours to observe water chemistry and the formation of scale. The system was maintained at 106° F. (41° C.) exit water temperature and cycled up in 1 or ½ cycle steps with a 24 hour evaluation period between each step. This incremental process of increasing the cycles of concentration was continued until scale started to appear on the test heat exchangers and/or a maximum calcium hardness was reached. The maximum stable saturation index is set at the concentration cycle ½ step below the point at which scale was detected and designated as $CSI_{max}$ for the particular treatment program being evaluated in this manner. FIG. 1 shows a chart of calcite saturation vs. pH and temperature for the makeup water composition reflected in Table 1 at 6 cycles of operation. As reflected in the data, this particular system experienced scaling over a very broad range. FIG. 2 shows the corresponding relationship between LSI and cycles of concentration for the test water.

Figure 3:
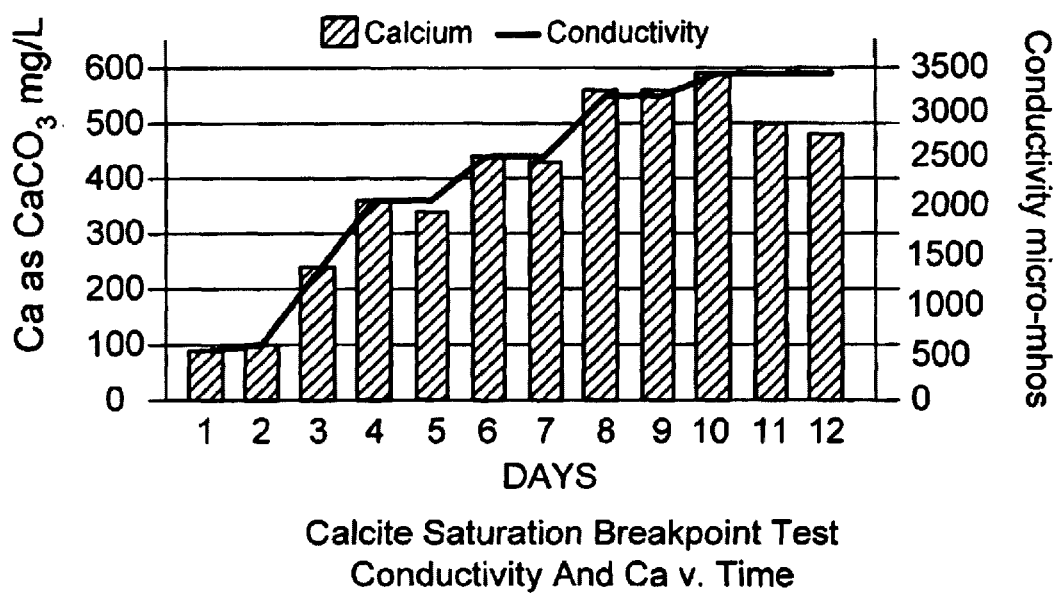
FIG. 3 shows a typical CSI breakpoint study with grab sample measurements of conductivity and calcium hardness.

FIG. 3 shows a typical CSI breakpoint study with grab sample measurements of conductivity and calcium hardness. As the number of cycles was increased, the conductivity and hardness increased proportionally until scaling occurred. The point at which the scaling occurred was indicated by a maximum in the calcium hardness value. As the scale developed, the calcium hardness decreased while conductivity remained constant. The value of the calcite saturation index ½ cycle before the point that the maximum calcium hardness was reached was then designated as the $CSI_{max}$. This method was found to be both highly reproducible and able to differentiate between the results that could be obtained using various treatment programs.

Figure 4:
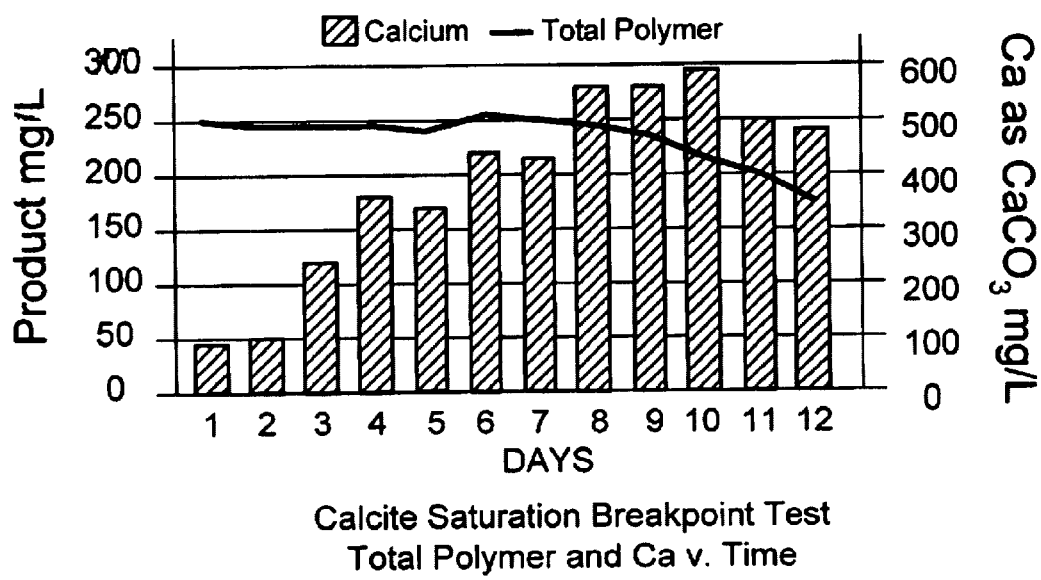
FIG. 4 shows total polymer and calcium hardness results obtained using a quad-polymer/phosphonate treatment formulation.

FIG. 4 shows total polymer and calcium hardness results obtained using a quad-polymer/phosphonate treatment formulation with the polymer concentrations expressed in terms of total product. As reflected in the data presented in FIG. 4, as the test progressed, the total polymer remained relatively constant although the calcium hardness was increasing. The total polymer level remained largely unaffected by the increasing level of calcium hardness in the aqueous system. Indeed, the total polymer level remained substantially constant even at cycles of operation just ½ cycle below the point at which scaling occurred. These results also reveal an increased demand for polymer just prior to the point at which the calcium hardness begins to decrease as calcium scale is formed on the system surfaces. It was also noted that the onset of scale formation was accompanied by a simultaneous decrease in the level of treatment chemicals. The cause of this decrease was identified during a subsequent analysis of the scale in which it was determined that both the polymer and phosphonate were incorporated into the scale deposits and thereby removed from the system. It was also noted that the levels of both total and free polymer remained approximately equal during this test. It is suspected that the small differences noted between the levels of free and total polymer indicates that the size of the suspended scale particles remained relatively small right up the point where the system started to break and substantial scale began to form on the wetted surfaces. The increased demand for both polymer and phosphonate just prior to the onset of scaling reinforces the importance of both monitoring and controlling the levels of treatment actives, particularly under high-stress operating conditions. The ability of being able to measure the quad-polymer/phosphonate treatment thereby provides an important advantage.

Figure 5:
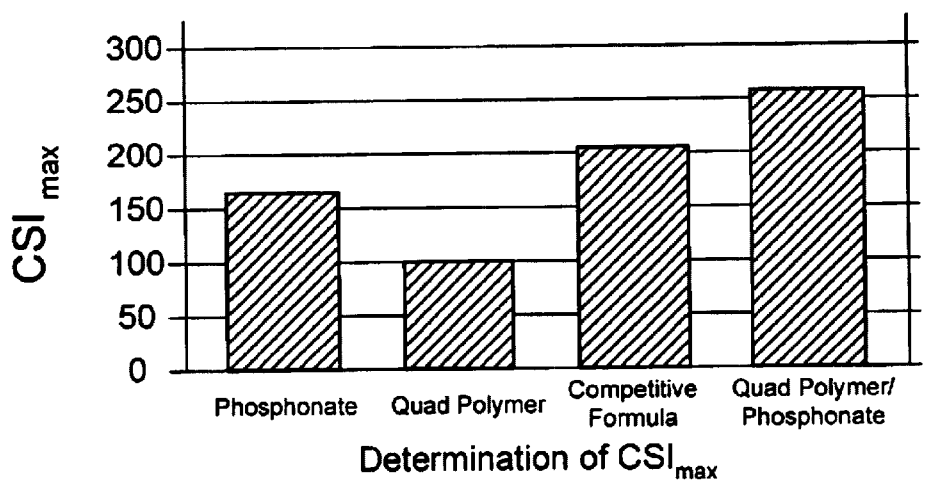
FIG. 5 shows the calculated values of $CSI_{max}$ for various treatment formulations on an equivalent cost basis.

FIG. 5 shows the calculated values of $CSI_{max}$ for various treatment formulations on an equivalent cost basis. The values provided in FIG. 5 demonstrate the increased effectiveness of quad-polymer/phosphonate over both a conventional AOP treatment and the corresponding single components of the quad-polymer formulation. The quad-polymer formulation is able to achieve a $CSI_{max}$ in excess of 270, a value that compares favorably to the results that can be obtained using either the phosphonate or the quad-polymer singly. Indeed, neither the phosphonate nor the quad-polymer used singly was able to achieve a $CSI_{max}$ of more than 170. Although not intending to be bound or limited by any particular theory or mechanism, it is suspected that the noted synergistic behavior achieved with the combination of the quad-polymer and the phosphonate may be the product of increased calcium phosphonate solubility provided by the quad-polymer coupled with extended calcium carbonate inhibition.

A recirculating closed loop heat exchanger system with a system volume of 31 liters was used to simulate a high-cycle, high-stress, system prone to magnesium silicate scaling. The makeup water fed into the system was a stable high magnesium and silica solution at a neutral pH having the composition reflected in Table 2 below.

TABLE 2

Makeup Water For Magnesium Silicate Break Point Tests

| | |
|---|---|
| pH (initial) | 7.8 |
| Total Hardness as $CaCO_3$, mg/L | 1050 |
| Calcium Hardness as $CaCO_3$, mg/L | 420 |
| Silica, as $SiO_2$ mg/L | 350 |

After the makeup water was introduced into the system, the treatment program under evaluation was added, and the heat exchanger heating rods turned on. Once the system was up to temperature (108° F./42° C.), 60 ml. of dilute caustic soda was titrated into the recirculating water at a rate of 0.5 ml./minute to induce controlled precipitation of magnesium silicate. The water was then circulated through the system for 24 hours with the temperature maintained at approximately 42° C. At the end of the 24-hour test period, six pre-weighed stainless steel tubular coupons were removed from the heating rods and weighed to determine the mass of scale that had developed on the coupons.

Figure 6:
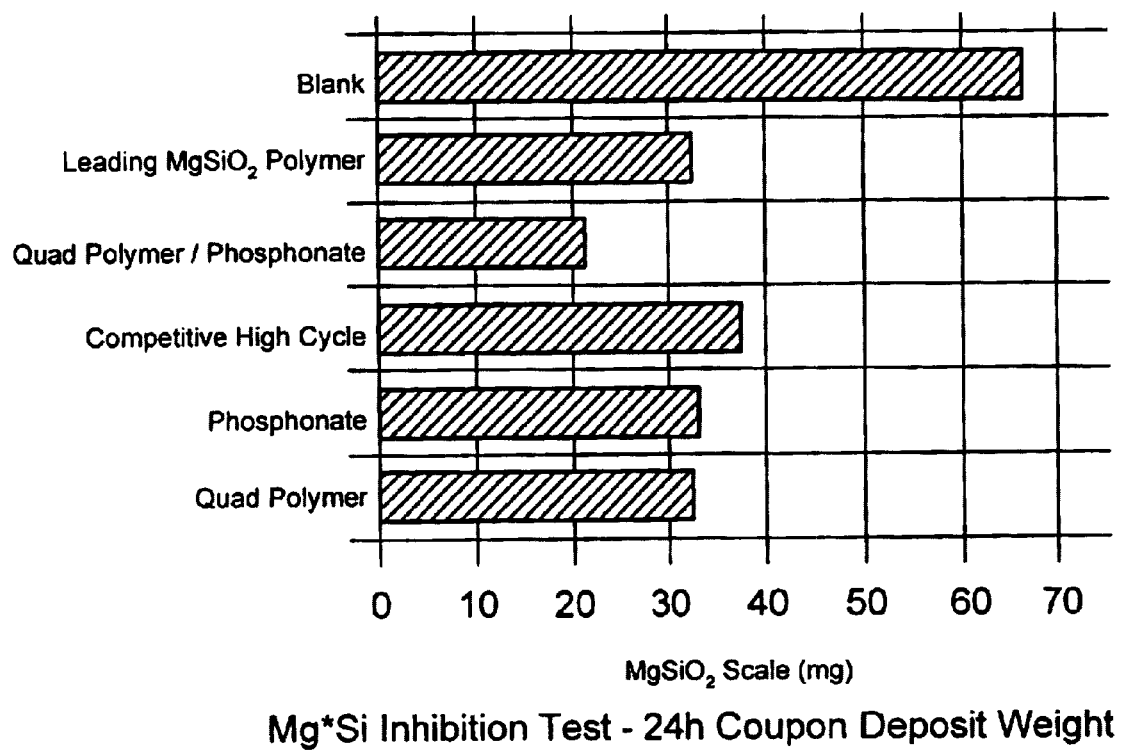
FIG. 6 shows deposit weight results for the magnesium silicate inhibition test comparing a number of treatment formulations including a leading magnesium silicate polymeric inhibitor, a competitive high-cycle program and the quad-polymer/phosphonate formulation.

FIG. 6 shows scale deposit weight results for the magnesium silicate inhibition test for a variety of treatment formulations. The treatment formulations included in FIG. 6 include a leading magnesium silicate polymeric inhibitor, a competitive high-cycle treatment program, and the quad-polymer/phosphonate formulation according to the present invention. As can be seen from the data provided in FIG. 6, the quad-polymer/phosphonate formulation provides significantly improved magnesium silicate deposit inhibition when compared with any of the other treatments on an equal cost basis. Further, as reflected in the results of the calcium carbonate inhibition test discussed above, the quad-polymer/phosphonate formulation exhibits a corresponding synergistic effect in inhibiting magnesium silicate scale over the results that can be obtained with the phosphonate and polymer components individually. This result clearly emphasizes the multifunctional character of the quad-polymer in its ability, when formulated with phosphonate, to inhibit the formation of both magnesium silicate and calcium carbonate.

Based on the favorable results obtained in the laboratory studies, an initial field experiment of the basic high-cycle quad-polymer chemistry was conducted at a chemical plant. The cooling system used at the chemical plant was an open recirculating system that had previously been treated with an alkaline phosphate treatment program based on a carboxylate technology. The system was operated without pH control and typically ran at between 2 and 3 cycles of concentration with reasonably good inhibition performance. However, due to the low cycles of concentration, the water consumption and program costs were unnecessarily high.

The system was then switched to the quad-polymer/phosphonate treatment program according to the present invention. Based on makeup water and system operating conditions, it was determined that the quad-polymer treatment program would permit the system to be operated at much higher cycles of concentration, typically at 5 to 6 cycles of concentration, while still providing good inhibition performance. The ability to operate the system at higher cycles of concentration would have a direct economic impact on the water treatment expenses. Indeed, it was estimated that for this particular system, every 10 gpm (37.9 liters per minute) of tower makeup water saved would translate into annual savings of approximately $20,000 in water/waste water and chemical treatment costs. In the case of increased water or sewer costs, the savings would be even greater.

Results of this initial high-cycle system experiment were exceptionally good. Over the course of the experiment, the system was operated at an average of 5.1 cycles of concentration. Despite this substantial increase in the cycles of concentration, the calcium and magnesium hardness transport through the high-cycle tower remained in balance, indicating no calcium carbonate, magnesium silicate, or other scale deposit was forming in the system. Further, the quad-polymer treatment program provided substantially equivalent corrosion control, matching the <1 mpy (mils per year) corrosion rate on mild steel that was obtained with the previous carboxylate treatment program.

TABLE 3

Chemical Plant Typical Makeup Water Analysis

| | |
|---|---|
| pH | 7.0 |
| Conductivity, μmhos | 385 |
| "M" Alkalinity, as mg/l CaCO3 | 90 |
| Calcium Hardness, as mg/l CaCO3 | 105 |
| Magnesium Hardness, as mg/l CaCO3 | 25 |
| Phosphate, mg/l | 0.1 |
| Iron, mg/l | 0.03 |

Table 3 shows a typical makeup water analysis from the system. At 5.1 cycles of concentration and pH 8.8 where the high-cycle water program has averaged, LSI and CSI are calculated at 2.81 and 201 respectively. These values are well within the maximum saturation limits obtained in the initial laboratory studies and suggest that further increases in cycles of concentration could be safely achieved. The applicants, therefore, expect that a water treatment composition and program according to the present invention would support operating the chemical plant system at even higher cycles of concentration while maintaining suitable scale inhibition. The applicants also anticipate that monitoring the system using free and total polymer comparative testing will permit operation at higher cycles while still ensuring that each of the key active components of the treatment composition are maintained at effective levels in the system.

A second field experiment was conducted using the high-cycle quad-polymer chemistry was conducted on a dairy plant cooling system in which the cycles of concentration were limited by the high levels of magnesium and silica present in the plant makeup water, a blend of city water and well water. As a result of the high levels of magnesium and silica present in the makeup water, magnesium silicate deposition would occur in the plant cooling systems whenever cycles of concentration approached 2.5. At 2.5 cycles, the product of Mg*Si was over 24,000, significantly exceeding the maximum value of 20,000 repeatedly noted in the literature and commonly used by those skilled in the art as a rule of thumb for avoiding magnesium silicate deposition. As a result of the increased potential for magnesium silicate deposition, the plant cooling systems had previously operated with the target of 2.0 for the cycles of concentration.

In order to increase the target value for the cycles of concentration, and thereby reduce both water consumption and discharge sewer costs, the quad-polymer technology according to the present invention was evaluated in the dairy cooling systems. During the evaluation, tower cycles were gradually increased with water samples being collected on a biweekly basis to monitor the mineral levels and conductivity of the recirculating water. The samples were then evaluated to determine the conductivity and the levels of magnesium, silica, and calcium in the system. A value for the cycles of concentration was then calculated from each of the measurements in order to evaluate magnesium silicate inhibition performance.

Typical analyses of the makeup and recirculating water during the experiment are shown in Table 4 below. Beginning at 2.0 cycles of concentration, the cycles of concentration in the cooling tower systems were gradually increased over a 2-month period. Cycles of concentration values were then calculated from the conductivity, calcium, magnesium, and silica data obtained

TABLE 4

West Coast Dairy Typical Water Analyses

|  | Prior Art Treatment | | | quad-polymer/phosphonate Treatment | | |
| --- | --- | --- | --- | --- | --- | --- |
|  | Makeup | Recirc. | Cycles | Makeup | Recirc. | Cycles |
| pH | 8.1 | 8.6 | — | 7.9 | 8.7 | — |
| Conductivity, $\mu$mhos | 1126 | 2433 | 2.2 | 1257 | 3692 | 2.9 |
| Calcium, mg/l as $CaCO_3$ | 302 | 669 | 2.2 | 330 | 1025 | 3.1 |
| Magnesium, mg/l as $CaCO_3$ | 123 | 249 | 2.0 | 136 | 434 | 3.2 |
| Silica, mg/l as $SiO_2$ | 31 | 63 | 2.0 | 32 | 99 | 3.1 | from the biweekly samples. The values for the cycles of concentration calculated from the measurements of the conductivity and calcium, magnesium, and silica levels remained substantially equal at cycles of concentration below about 3.5. However, as the system approached 3.5 cycles of concentration, the values of the cycles of concentration calculated from the conductivity and the measured levels of calcium, magnesium, and silica began to diverge. The divergence in the calculated values suggested that magnesium silicate deposits were beginning to form, thereby reducing the concentration of both magnesium and silica in the system without a corresponding reduction in the conductivity or calcium levels. Based on these results, it was determined that 3.0 cycles of concentration was a safe maximum target for operation of the plant cooling systems. When compared with the old target, the new target of 3.0 cycles of concentration would provide a 50% increase reduction in cooling tower blow-down rates and a corresponding reduction in the water treatment costs. Further, given that the magnesium/silica product at 3.0 cycles of concentration was over 37,000, the quad-polymer/phosphonate treatment composition according to the present invention allowed safe operation at levels well in excess of those previously considered safe.

The advantages of the present invention were further demonstrated by comparing the performance of the preferred quad-polymer/phosphonate formulation with the prior art water treatment composition as taught in U.S. Pat. No. 5,709,814 to Gill ("Gill") which describes and claims the use of a synergistic blend of polymers and phosphonates, specifically a combination of a polyether polyamino methylene phosphonate, a terpolymer comprising the monomers of acrylic acid, sulfophenomethallyl ether and maleic acid, and a hydroxyphosphonoacetic acid, to achieve high calcite saturation levels. Table 5 shows the results for a pilot cooling tower CSI breakpoint study comparing the preferred quad-polymer/phosphonate formulation with a typical use dosage of 200 mg/liter of the water treatment composition taught by Gill.

TABLE 5

Results for CSI breakpoint test

| Treatment Composition | quad-polymer:phosphonate (12 mg/L:6 mg/L) | Formulation according to U.S. Pat. No. 5,709,814 (200 mg/l) |
| --- | --- | --- |
| $CSI_{max}$ | 265 | 253 |
| Phosphate Level | 2.32 | 10.68 |
| Condition at CSI Breakpoint | Light scale on heat transfer surface. Little deposition in other areas of the tower. System water takes on a milky appearance. | Heavy precipitation throughout the cooling tower, particularly in low flow areas. |

The results of this study demonstrate the improved performance of the preferred quad-polymer/phosphonate formulation when compared with the patented treatment composition taught by Gill. The quad-polymer/phosphonate formulation achieved a higher CSI while simultaneously maintaining much lower levels of total phosphate and reducing the amount of scaling at the CSI breakpoint. The more forgiving performance of the quad-polymer/phosphonate formulation at the CSI breakpoint is particularly important in preventing tower film fill fouling. Indeed, heavy deposition and fouling within the tower fill can lead to excessive loading and, in extreme cases, can actually cause the fill to collapse. The ability of the preferred quad-polymer/phosphonate composition to minimize fouling by keeping the majority of the precipitated calcium carbonate suspended was evident from both the minimal scaling and the milky appearance of the solution. As noted in Table 5, however, even at significantly higher treatment levels, the prior art composition of Gill was unable to maintain the precipitated calcium carbonate in solution, resulting in the accumulation of thick deposits in the low flow areas of the cooling tower.

The synergistic effects of concentrations of the preferred quad-polymer/phosphonate composition were further investigated through a series of CSI breakpoint experiments. The data provided in Table 6 reflects the $CSI_{max}$ results obtained using varying concentrations of both the quad-polymer and phosphonate components of the present invention. In addition to illustrating the synergistic effects of the quad-polymer/phosphonate combination, the data indicated that certain concentration levels and certain ratios of the quad-polymer and phosphonate concentration levels result in better performance and are, therefore, generally preferred. With respect to the concentration of phosphonate, the experimental data suggests that a concentration of at least 4–5 mg/L is required to achieve $CSI_{max}$ levels greater than 200 in the treated system. Although other compositions may provide acceptable results, the most preferred compositions for calcium carbonate control are those having quad-polymer/phosphonate ratios in the range 1:1 to 2:1 with the phosphonate level in the 4–8 mg/L range and the quad-polymer-level in the 4–16 mg/L range. From the experimental data, it also appears that compositions having concentrations outside of these ranges will exhibit somewhat diminished performance in the area of calcium carbonate stabilization.

The applicants also note that those of skill in the art will appreciate that the optimum ratio of quad-polymer/phosphonate treatment system may be affected by the presence of impurities in the water such as iron, suspended solids or phosphate which would place additional demands on the treatment. In such instances, the applicants expect that the optimum composition may require an increased level of the quad-polymer-component and that a quad-polymer/phosphonate ratio as high as 4:1, and perhaps even higher, may be necessary to achieve the desired control. Those of ordinary skill will appreciate that the optimum levels of treatment actives and the maximum cycles of concentration will vary from system to system and will depend on the composition of the available makeup water. In light of the variations between systems and makeup water compositions, it is common practice to make adjust both the treatment chemical levels and the cycles of concentration on a system-specific basis. Such anticipated and expected adjustments and modifications, therefore, do not represent a departure from the claimed invention.

TABLE 6

$CSI_{max}$ For Selected quad-polymer/phosphonate Combinations

| Quad-Polymer (mg/l) | Phosphonate (mg/l) | Ratio Quad-Polymer:Phosphonate | CSI max. |
|---|---|---|---|
| 0 | 10.0 | 0:1 | 168 |
| 4.0 | 5.0 | 0.8:1 | 268 |
| 7.0 | 7.0 | 1.0:1 | 251 |
| 9.0 | 6.0 | 1.5:1 | 260 |
| 12 | 6.0 | 2.0:1 | 260 |
| 15 | 6.0 | 2.5:1 | 260 |
| 16 | 4.0 | 4.0:1 | 193 |
| 20 | 0 | 1:0 | 76 |

As will be appreciated by persons skilled in the art, various modifications, adaptations, and variations of the present disclosure can be made without departing from the teachings of the present invention.

We claim:

1. A method of treating an aqueous system operating at a high degree of saturation characterized by a calcite saturation index of at least 100 or a Mg*Si value of at least 20,000 with a chemical treatment composition to inhibit calcium carbonate and magnesium silicate scale, the chemical treatment composition comprising a quad-polymer, the quad-polymer including as monomers about 3.5 mole % allyloxybenzenesulfonic acid, about 2.5 mole % methallyl sulfonic acid, about 13–18 mole % methyl methacrylate and about 76–81 mole % acrylic acid and having a molecular weight of less than about 50,000, and a phosphonate, the phosphonate being 2 phosphonobutane 1,2,4 tricarboxylic acid, the volume of the aqueous system being maintained through the addition of makeup water, comprising the steps of:

maintaining a concentration of the quad-polymer in the aqueous system;

maintaining a concentration of the phosphonate in the aqueous system;

wherein the quad-polymer and the phosphonate are present in the chemical treatment composition in a ratio ranging from about 1:1 to about 4:1 and exhibit a synergistic level of scale inhibition.

2. A method of treating an aqueous system with a chemical treatment composition according to claim 1 wherein the phosphonate is present in the aqueous system at a concentration of not less than about 4 mg/L.

3. A method of treating an aqueous system with a chemical treatment composition according to claim 2 wherein the phosphonate is present in the aqueous system at a concentration of between about 4 mg/L and about 8 mg/L.

4. A method of treating an aqueous system with a chemical treatment composition comprising a quad-polymer, the quad-polymer including as monomers about 3.5 mole % allyloxybenzenesulfonic acid, about 2.5 mole % methallyl sulfonic acid, about 13–18 mole % methyl methacrylate and about 76–81 mole % acrylic acid and having a molecular weight of less than about 50,000, and a phosphonate, the phosphonate being 2 phosphonobutane 1,2,4 tricarboxylic acid, the volume of the aqueous system being maintained through the addition of makeup water, comprising the steps of determining the composition of the makeup water;

calculating the number of concentration cycles of the makeup water sufficient to produce a calcite saturation index of at least 100;

operating the aqueous system at the calculated number of concentration cycles;

monitoring the concentration of the quad-polymer in the aqueous system; and adding a sufficient quantity of the chemical treatment composition to maintain the concentration of the quad-polymer in the aqueous system within a predetermined range wherein the quad-polymer and the phosphonate are present in the chemical treatment composition in a ratio ranging from about 1:1 to about 4:1.

5. A method of treating an aqueous system with a chemical treatment composition according to claim 4 wherein the phosphonate is present in the aqueous system at a concentration of not less than about 4 mg/L.

6. A method of treating an aqueous system with a chemical treatment composition according to claim 5 wherein the phosphonate is present in the aqueous system at a concentration of between about 4 mg/L and about 8 mg/L.

7. A method of treating an aqueous system with a chemical treatment composition according to claim 6 wherein the steps of monitoring the concentration of the quad-polymer in the aqueous system and adding a sufficient quantity of the chemical treatment composition arc performed automatically.

8. A method of treating an aqueous system with a chemical treatment composition according to claim 6 wherein the steps of monitoring the concentration of the quad-polymer in the aqueous system, the quad-polymer being present in the aqueous system as free polymer and bound polymer, further comprises the steps of determining the level of the free polymer in the aqueous system;

determining the level of the total polymer in the aqueous system, the total polymer comprising the sum of the bound polymer and the free polymer; and calculating the polymer inhibition efficiency of the aqueous system from the levels of free polymer and total polymer.

9. A method of treating an aqueous system with a chemical treatment composition according to claim 6 wherein the number of concentration cycles of the makeup water is sufficient to produce a calcite saturation index of at least 250.

10. A method of treating an aqueous system with a chemical treatment composition according to claim 4 wherein the steps of determining the composition of the makeup water and calculating the number of concentration cycles of the makeup water sufficient to produce a calcite saturation index of at least 100 are performed automatically.

11. A method of treating an aqueous system with a chemical treatment composition comprising a quad-polymer, the quad-polymer including as monomers about 3.5 mole % allyloxybenzenesulfonic acid, about 2.5 mole % methallyl sulfonic acid, about 13–18 mole % methyl methacrylate and about 76–81 mole % acrylic acid and having a molecular weight of less than about 50,000, and a phosphonate, the phosphonate being 2 phosphonobutane 1,2,4 tricarboxylic acid, the volume of the aqueous system being maintained through the addition of makeup water, comprising the steps of:

determining the composition of the makeup water;

calculating the number of concentration cycles of the makeup water sufficient to produce a Mg*Si product of at least 20,000;

operating the aqueous system at the calculated number of concentration cycles;

monitoring the concentration of the quad-polymer in the aqueous system; and adding a sufficient quantity of the chemical treatment composition to maintain the concentration of the quad-polymer in the aqueous system within a predetermined range wherein the quad-polymer and the phosphonate are present in the chemical treatment composition in a ratio ranging from about 1:1 to about 4:1.

12. A method of treating an aqueous system with a chemical treatment composition according to claim 11 wherein the phosphonate is present in the aqueous system at a concentration of not less than about 4 mg/L.

13. A method of treating an aqueous system with a chemical treatment composition according to claim 11 wherein the phosphonate is present in the aqueous system at a concentration of between about 4 mg/L and about 8 mg/L.

14. A method of treating an aqueous system with a chemical treatment composition according to claim 11 wherein the steps of monitoring the concentration of the quad-polymer in the aqueous system and adding a sufficient quantity of the chemical treatment composition are performed automatically.

15. A method of treating an aqueous system with a chemical treatment composition according to claim 11 wherein the steps of monitoring the concentration of the quad-polymer in the aqueous system, the quad-polymer being present in the aqueous system as free polymer and bound polymer, further comprises the steps of determining the level of the free polymer in the aqueous system;

determining the level of the total polymer in the aqueous system, the total polymer comprising the sum of the bound polymer and the free polymer; and calculating the polymer inhibition efficiency of the aqueous system from the levels of free polymer and total polymer.

16. A method of treating an aqueous system with a chemical treatment composition according to claim 11 wherein the number of concentration cycles of the makeup water is sufficient to produce a Mg*Si product of at least 25,000.

17. A method of treating an aqueous system with a chemical treatment composition according to claim 11 wherein the steps of determining the composition of the makeup water and calculating the number of concentration cycles of the makeup water sufficient to produce a Mg*Si product of at least 20,000 are performed automatically.

* * * * *